United States Patent
Fricker

(10) Patent No.: US 10,235,314 B2
(45) Date of Patent: Mar. 19, 2019

(54) FABRIC FOR MODULAR SOLID-STATE STORAGE SYSTEMS

(71) Applicant: EMC Corporation, Hopkinton, MA (US)

(72) Inventor: Jean-Philippe Fricker, Mountain View, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 187 days.

(21) Appl. No.: 14/981,686

(22) Filed: Dec. 28, 2015

(65) Prior Publication Data

US 2017/0185554 A1    Jun. 29, 2017

(51) Int. Cl.
*G06F 13/40* (2006.01)
*G06F 13/16* (2006.01)
*G06F 13/42* (2006.01)

(52) U.S. Cl.
CPC ...... *G06F 13/4022* (2013.01); *G06F 13/1605* (2013.01); *G06F 13/4068* (2013.01); *G06F 13/4282* (2013.01)

(58) Field of Classification Search
CPC ............. G06F 13/4022; G06F 13/1605; G06F 13/4068; G06F 13/4282
USPC ........... 710/74, 105, 316, 14, 31, 33, 38, 51; 713/600
See application file for complete search history.

(56) References Cited

U.S. PATENT DOCUMENTS

| | | | |
|---|---|---|---|
| 6,154,587 A * | 11/2000 | Okayama | H04Q 11/0005 385/24 |
| 8,667,110 B2 | 3/2014 | Groenendaal et al. | |
| 9,529,545 B1 | 12/2016 | Bono et al. | |
| 9,576,165 B2 | 2/2017 | Curren et al. | |
| 9,898,375 B1 | 2/2018 | Fricker | |
| 2001/0046348 A1 * | 11/2001 | Sarkimukka | H04B 10/2569 385/24 |
| 2009/0166423 A1 | 7/2009 | Dischamp et al. | |
| 2010/0122107 A1 | 5/2010 | Arimilli et al. | |
| 2012/0284435 A1 | 11/2012 | Myrah et al. | |
| 2013/0129345 A1 * | 5/2013 | Meng | H04J 3/0682 398/25 |
| 2013/0166813 A1 | 6/2013 | Chandra et al. | |
| 2013/0259465 A1 * | 10/2013 | Blair | H04B 10/27 398/2 |

(Continued)

*Primary Examiner* — Farley Abad
*Assistant Examiner* — Henry W Yu
(74) *Attorney, Agent, or Firm* — Chamberlain, Hrdlicka, White, Williams & Aughtry

(57) ABSTRACT

A storage system including a hardware module slot, configured to mechanically accommodate a first hardware module. The hardware module slot includes a hardware module data connector configured to electrically interface with the first hardware module inserted into the hardware module slot. The storage system further includes a fabric that includes a first switch. The first switch includes a first protocol interface to the hardware module data connector and is configured to enable first protocol communications between the first hardware module and a second hardware module. The fabric also includes a second switch that includes a second protocol interface to the hardware module data connector and is configured to enable second protocol communications between the first hardware module and the second hardware module.

15 Claims, 11 Drawing Sheets

(56) References Cited

U.S. PATENT DOCUMENTS

2013/0268714 A1 10/2013 Brundridge et al.
2016/0188472 A1 6/2016 Forrest et al.

* cited by examiner

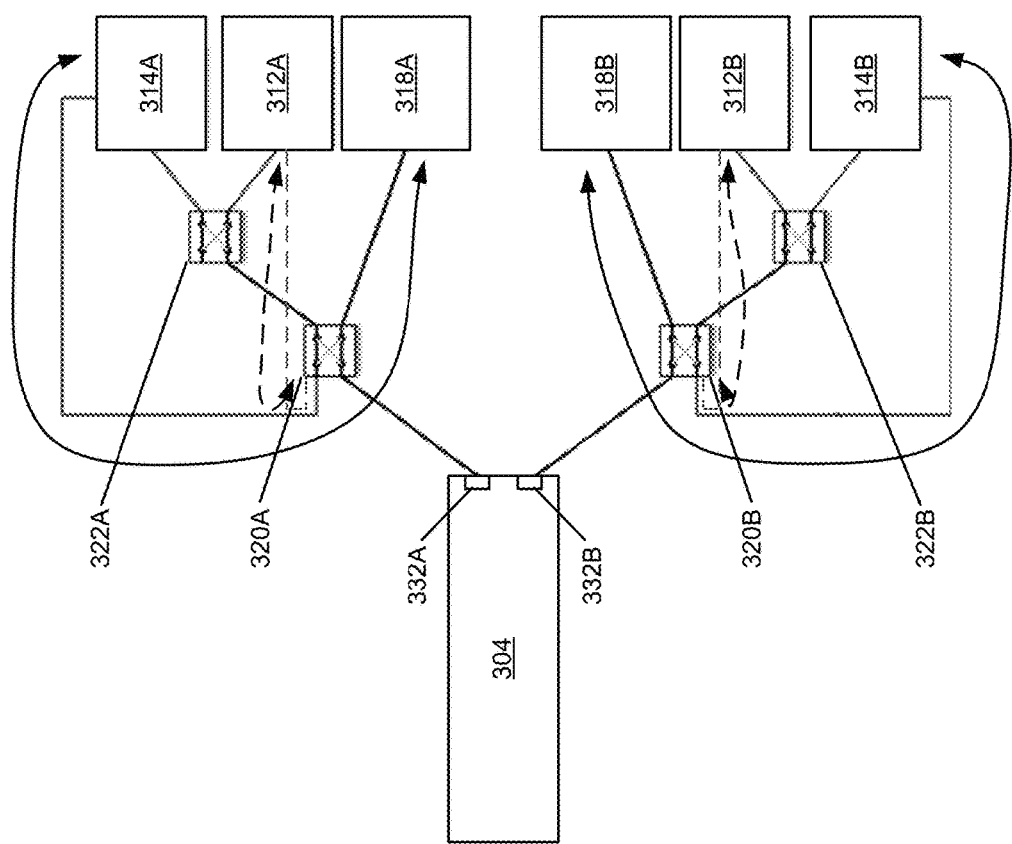

FABRIC FOR MODULAR SOLID-STATE STORAGE SYSTEMS

BACKGROUND

Modular storage systems may house storage modules, inserted into the modular storage system. A fabric may provide an interface for data exchange between the storage modules and/or with equipment located outside the storage system.

DETAILED DESCRIPTION

Figure 1A:
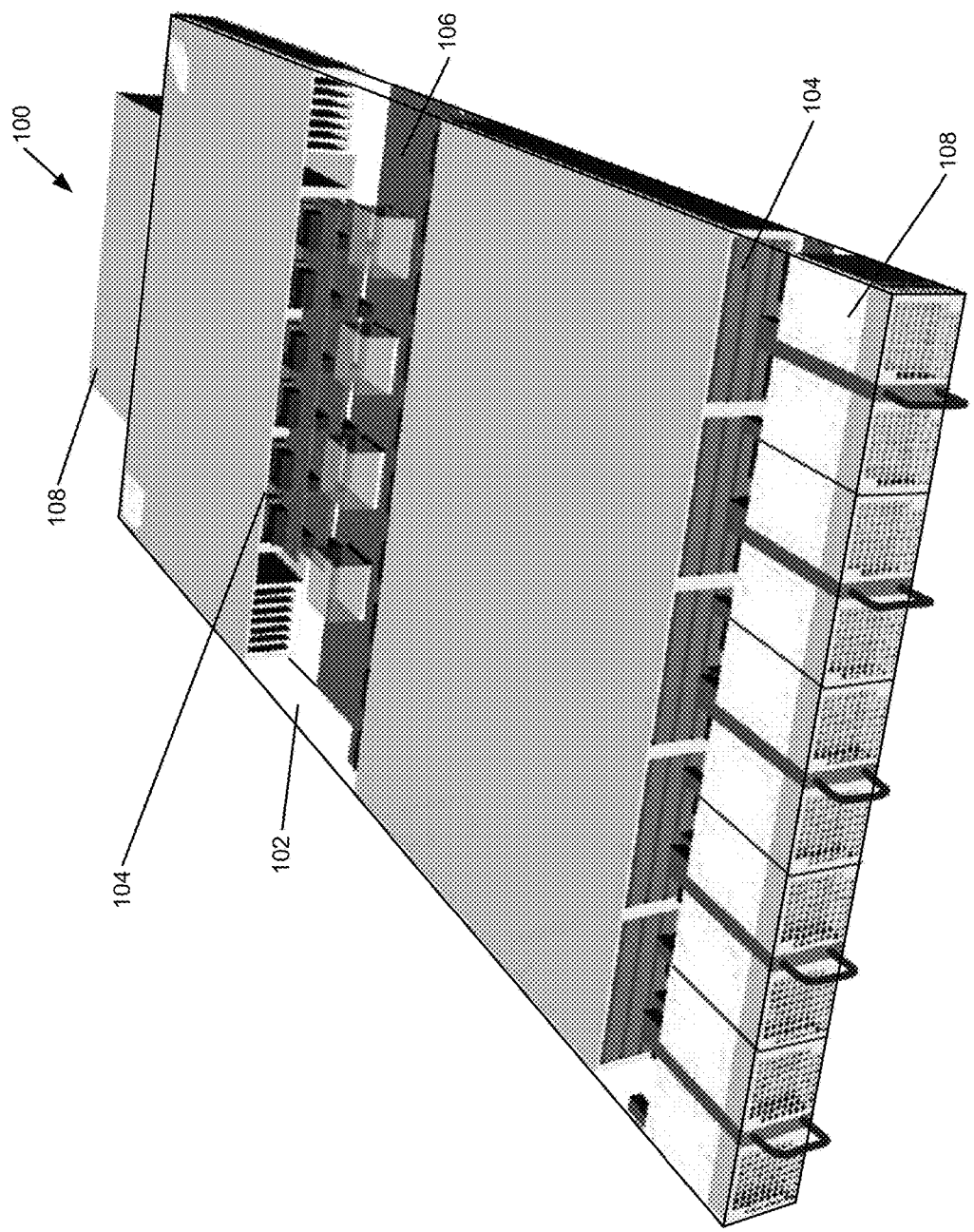
FIGS. 1A-1C show storage assembly systems, in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1A-4F, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment which may be implemented in addition to, in conjunction with, or in place of the embodiments described with regard to a corresponding like-named component in any other figure.

In general, embodiments of the technology are directed to storage assembly systems that may accommodate storage modules and/or other types of hardware modules. More specifically, one or more embodiments disclosed herein may be directed to fabrics of storage assembly systems that may provide an interface for data exchange between the hardware modules in the storage assembly system and/or with equipment located outside the storage assembly system.

Figure 1B:
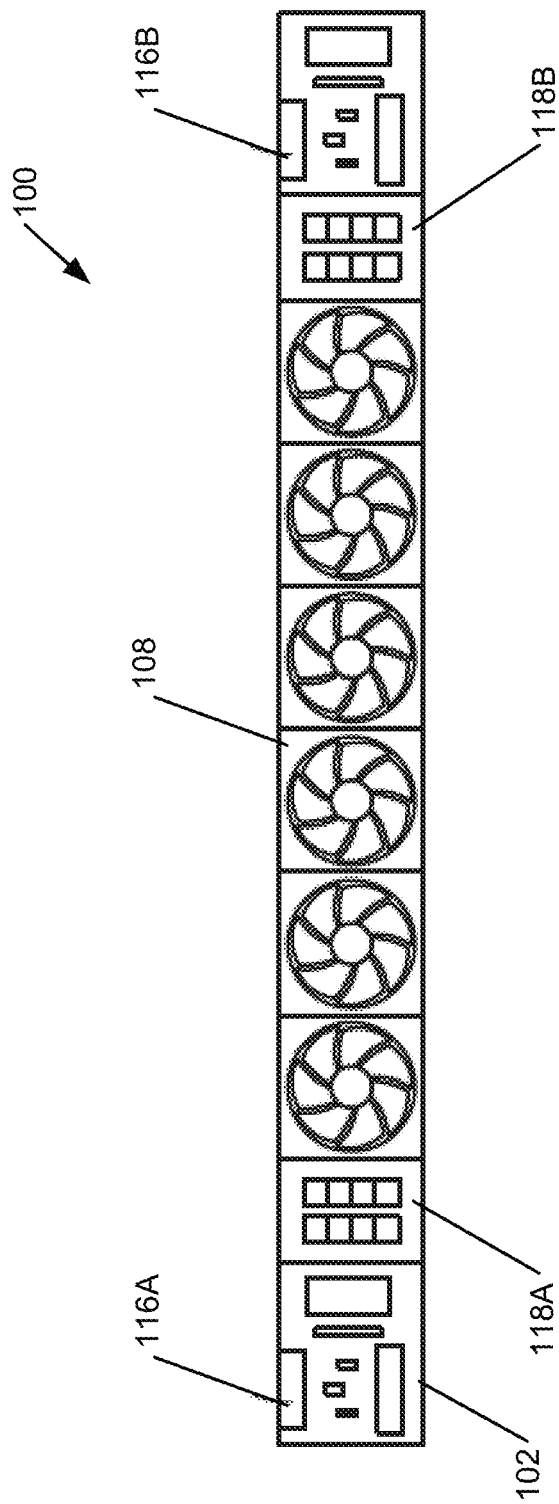
Figure 1C:
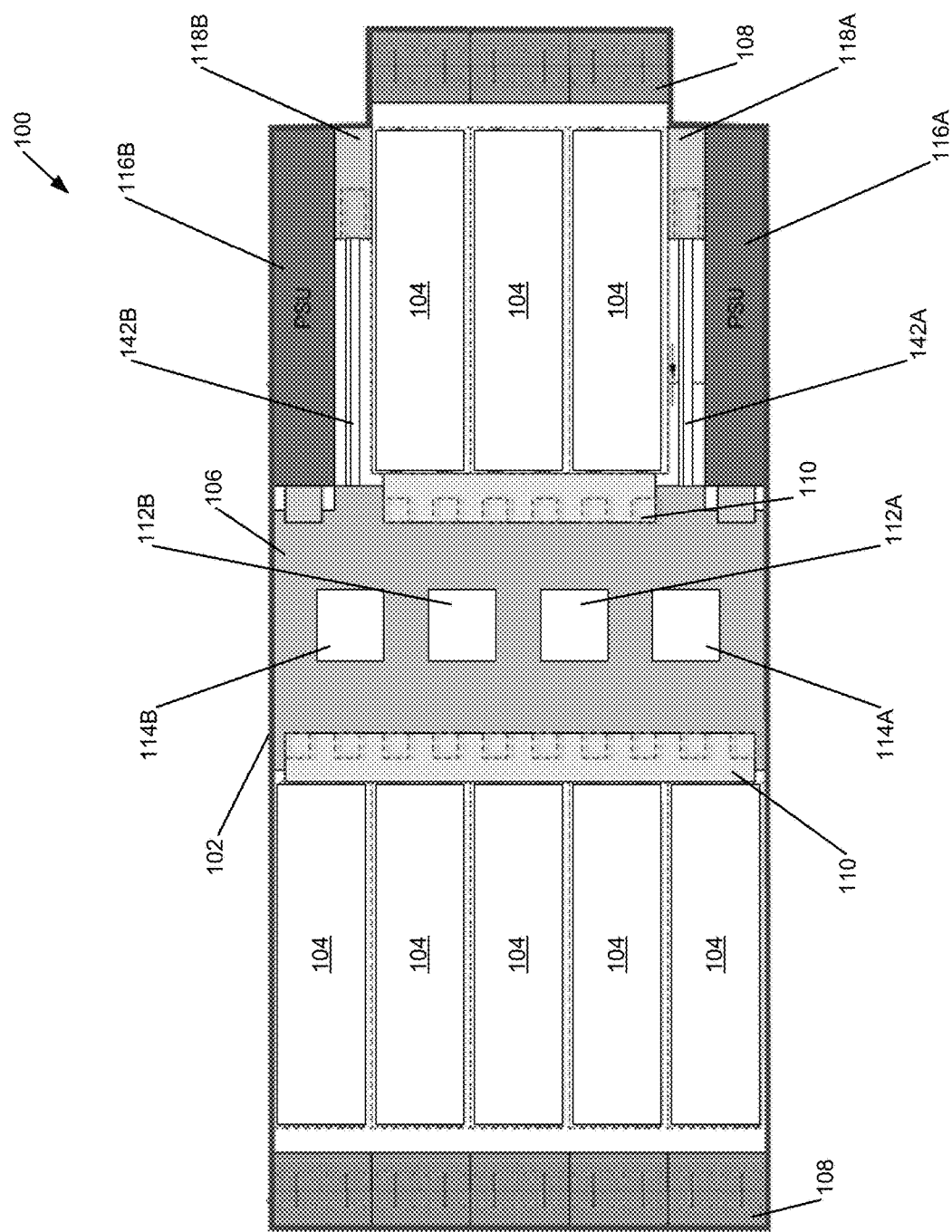

FIGS. 1A-1C show multiple views of a storage assembly system (100) in accordance with one or more embodiments of the technology. FIG. 1A shows a perspective view of the storage assembly system (100), where the top cover has been removed. FIG. 1B shows a rear view of the storage assembly system (100), and FIG. 1C shows a top view of the storage assembly system (100), where the top cover has been removed.

The storage assembly system (100), in accordance with one or more embodiments of the technology, includes a chassis (102), a set of solid state storage modules (104), a main printed circuit board (PCB) (106), a set of fan modules (108) and one or more power supplies (116A, 116B). The chassis (102) may be an enclosure, e.g., a metal case, that components, including the solid state storage modules (104), may be disposed within. A solid state storage module may be, for example, a NAND Flash memory module, a NOR Flash memory module, a Magnetic RAM Memory (MRAM) module, a Spin Torque Magnetic RAM Memory (ST-MRAM) module, a Phase Change Memory (PCM) module, a memristive memory module, or any other memory module defined as a non-volatile Storage Class Memory (SCM) module.

One or more solid state storage modules (104), may be disposed into the chassis (102) in a hardware module slot. In the exemplary embodiments shown in FIGS. 1A-1C, horizontally oriented solid state storage modules (104) may be inserted into hardware module slots of the chassis. Up to three solid state storage modules may be stacked, and up to five stacks of solid state storage modules may be adjacently placed in a front area of the chassis. An additional three stacks of solid state storage modules may be located in the back of the chassis. Accordingly, the chassis may accommodate up to 24 solid state storage modules (104).

Those skilled in the art will appreciate that the technology is not limited to the configuration displayed in FIGS. 1A-1C. For example, a chassis may accommodate more or fewer solid state storage modules. Further, solid state storage modules may have different form factors. For example, a larger size solid state storage module may require additional space, and the larger solid state storage module may not be stackable if it occupies the space of three stacked regular solid state storage modules. Further, other hardware modules may be inserted into the chassis (102), in addition to, or instead of solid state storage modules. For example, a compute module that may include a processor and/or other hardware such as random access memory (RAM) may be inserted. Those skilled in the art will recognize that any type of hardware module, capable of performing computing and/or storage tasks, may be inserted into the chassis.

In one or more embodiments of the technology, a solid state storage module (104), inserted into the chassis (102), electrically interfaces with electronic circuits on the main printed circuit board (PCB) (106). These electronic circuits may enable communication to and from the solid state circuit modules (104), and are described in detail below. The connections between the solid state storage modules and the electronic circuits on the main PCB may be established via midplane PCBs (110). Connectors on the solid state storage modules (104) may mate with matching connectors on the midplane PCBs (110).

In one embodiment of the technology, a solid state storage module (104) is equipped with two data connectors. Each of these solid state storage module data connectors (or hardware module data connectors, in general) may provide a communication protocol-independent electric communication interface. Accordingly, solid state storage modules may use different communication protocols for the communication with the electronic circuits on the main PCB (106) via the same solid state storage module data connectors.

A solid state storage module may, for example, use the Peripheral Component Interconnect Express (PCIe) communication protocol (e.g. PCIe ×4), whereas another solid state storage module may use the Gigabit Ethernet (GbE) communication protocol, or the Fibre Channel communication protocol. Those skilled in the art will recognize that any communication protocols suitable for solid state storage modules (or any other type of hardware module that may be accommodated in the storage assembly system (100)) may be used. This, in addition to the previously mentioned protocols, also includes, for example, InfiniBand, Non-Volatile Memory Express (NVMe), NVMe over a PCIe fabric, NVMe over an Ethernet fabric and NVMe over an Infiniband fabric.

Regardless of the protocol being used by a solid state storage module (104), data communications may be performed using the same data connectors on the midplane PCBs (110) that receive the solid state storage module data connectors when the solid state storage module (104) is inserted.

In one embodiment of the technology, the main PCB (106) includes a chipset that supports the above protocols. Upon insertion of a solid state storage module (104) into the chassis (102), the solid state storage module may identify itself to interface with the appropriate chipset on the main PCB (106). For example, a solid state storage module (104) that uses the PCIe protocol may interface with a PCIe switch (112A, 112B) on the main PCB (106), whereas another solid state storage module (104) that uses the GbE protocol may interface with a GbE switch (114A, 114B), supporting, for example, 10/25/40/50/100 GbE, on the main PCB (106). The chipset on the main PCB is part of the fabric that enables communication between the solid state storage modules within the chassis (102) and between solid state storage modules (104) within the chassis (102) and other equipment outside the storage assembly system (100), via one or more chassis data connectors (118A, 118B), in accordance with one or more embodiments of the technology. The chassis data connectors (118A, 118B) may be high density data connectors with numerous electric contacts and/or fiber-optic feedthroughs. The chassis data connectors may interface with the main PCB (106) via the chassis data connector wiring (142A, 142B). The chassis data connector wiring may include, for example, copper traces on a PCB extension of the main PCB, bundles of wires, and/or optical fibers. The chassis data connectors may be used for communications using various protocols, as further described below.

Figure 2:
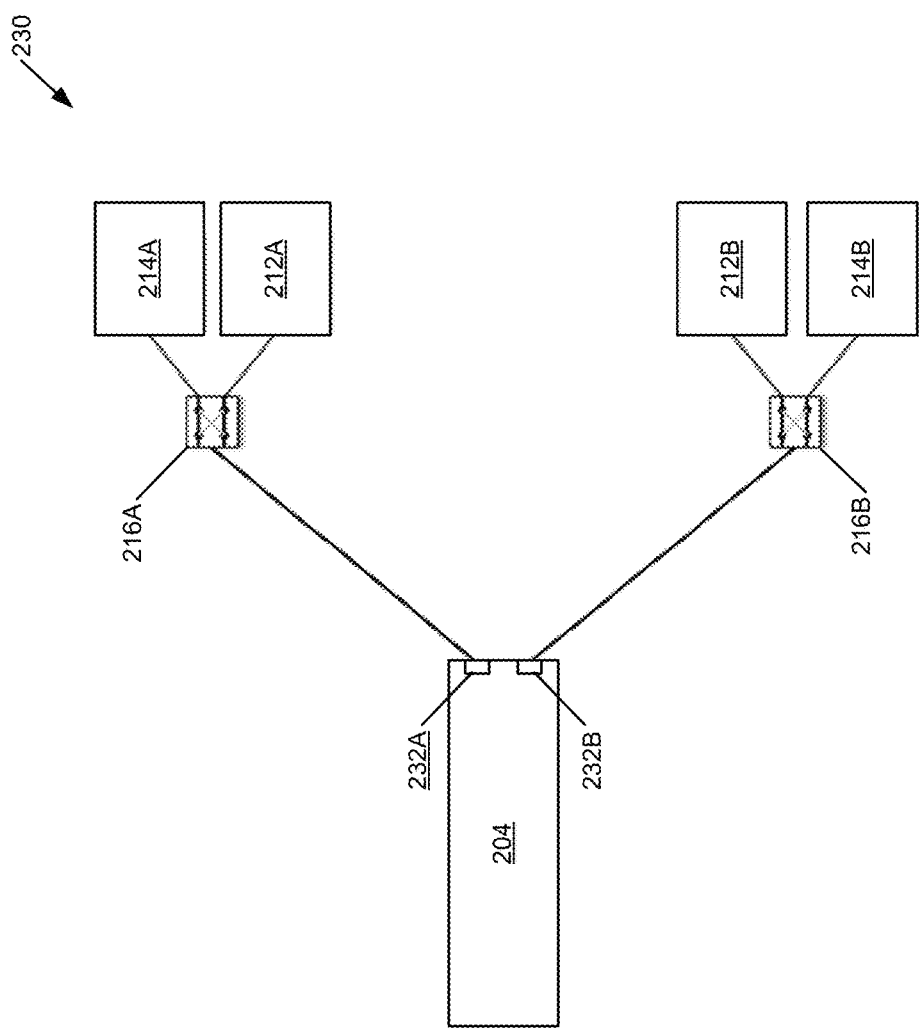
FIGS. 2 and 4F show fabrics of storage assembly systems, in accordance with one or more embodiments of the technology.

FIG. 2 shows a fabric of a storage assembly system, in accordance with one or more embodiments of the technology. In the exemplary storage assembly system (100), shown in FIGS. 1A-1C, solid state storage modules may be accommodated in stacks. Each stack may include a lower, a center and an upper solid state storage module. All upper and lower solid state storage modules in the chassis (102) use the fabric shown in FIG. 2. All center storage modules use a different fabric, described with reference to FIG. 3. The fabric (230) interfaces with a set of solid state storage modules (204) and includes Peripheral Component Interconnect Express (PCIe) switches (212A, 212B), Gigabit Ethernet (GbE) switches (214A, 214B), and a set of 2:1 multiplexers (216A, 216B). Each of these components is described below. A storage assembly system such as the one shown in FIGS. 1A-1C may accommodate up to 24 solid state storage modules. However, for the sake of simplicity, only a single solid state storage module is shown in FIG. 2. Each of the solid state storage modules (204) in a storage assembly system may interface with the PCIe switches (212A, 212B) and/or the GbE switches (214A, 214B) via its own 2:1 multiplexers (216A, 216B), i.e., there may be separate, dedicated 2:1 multiplexers that each interface a particular solid state storage module (204) of the storage assembly system to the PCIe switches (212A, 212B) and to the GbE switches (214A, 214B).

Each solid state storage module (204) may be equipped with two solid state storage module data connectors (232A, 232B) that may redundantly interface with separate fabric segments, as shown in FIG. 2, thus enabling simultaneous data communications for increased data throughput and/or redundancy. The two connectors may use the same communication protocol, e.g., both connectors may carry data using the GbE or the PCIe protocol. Alternatively, one connector may be dedicated to GbE protocol communications, whereas the other connector may be dedicated to PCIe protocol communications. Further a single connector may also carry a combination of GbE and PCIe protocol data signals.

As previously noted, solid state storage modules may use various protocols. In the embodiment shown in FIG. 2, a solid state storage module may use either the GbE or the PCIe protocol. In one embodiment of the technology, a solid state storage module used 25 GbE to communicate. Another solid state storage module, in accordance with an embodiment of the technology uses PCIe ×4 to communicate. Regardless of the protocol being used, the solid state storage modules (204) may interface with the fabric (230) via the solid state storage module data connectors (232A, 232B). If a solid state storage module (204) uses the GbE protocol, the 2:1 multiplexers (216A, 216B) may interface the solid state storage module (204) with the GbE switches (214A, 214B), and if the solid state storage module (204) uses the PCIe protocol, the 2:1 multiplexers (216A, 216B) may interface the solid state storage module (204) with the PCIe switches (212A, 212B). The 2:1 multiplexers (216A, 216B), in accordance with one or more embodiments of the technology, may handle communications using any communication protocol used by the solid state storage modules (204).

In one embodiment of the technology, a 2:1 multiplexer is configured to perform as a switch with at least two switching states. In the first switching state, the 2:1 multiplexer may interface the solid state storage module (204) with a PCIe switch (212A, 212B), whereas in the second switching state, the 2:1 multiplexer may interface the solid state storage module (204) with a GbE switch (214A, 214B). The first or the second switching state may be selected based on the protocol used by the solid state storage module. The protocol used by the solid state storage module may be detected by the 2:1 multiplexer itself, or by a separate circuit that notifies the 2:1 multiplexer of the detected protocol.

In one embodiment of the technology, a 2:1 multiplexer further reconditions the signals to and from a solid state storage module, for example, to extend the maximum possible cable or trace lengths. The 2:1 multiplexer may be protocol-agnostic and may be, for example, an analog amplifier that may further perform filtering. Alternatively, the 2:1 multiplexer may re-clock/re-time the data signals. In this case, the 2:1 multiplexer may be clock-aware and may recognize and support the protocol being used by the attached solid state storage module.

As previously noted, each solid state storage module may interface with switches. In the embodiment shown in FIG. 2, each solid state storage module may interface with either a set of PCIe switches (212A, 212B), or with a set of GbE switches (214A, 214B). Each of the switches may establish data connections between any solid state storage modules interfacing with the switch, as needed for data exchanges. However, in the embodiment shown in FIG. 2, a switch may not be able to directly establish a connection of solid state storage modules that use different protocols. For example, a solid state storage module that uses the PCIe protocol may not be able to directly communicate with another solid state storage module that uses the GbE protocol because these protocols are handled by separate switches. Further, in the embodiment shown in FIG. 2, the solid state storage modules may also not be able to directly communicate with the equipment outside the storage assembly system. However, a solid state storage module may indirectly be able to communicate with solid state storage modules that use a different protocol, by performing the communication via a third hardware module, e.g., a compute module or any other type of hardware module that interfaces with or is part of the fabric described below with reference to FIG. 3. This approach may also allow the solid state storage module to indirectly communicate with equipment outside the storage assembly system.

Figure 3:
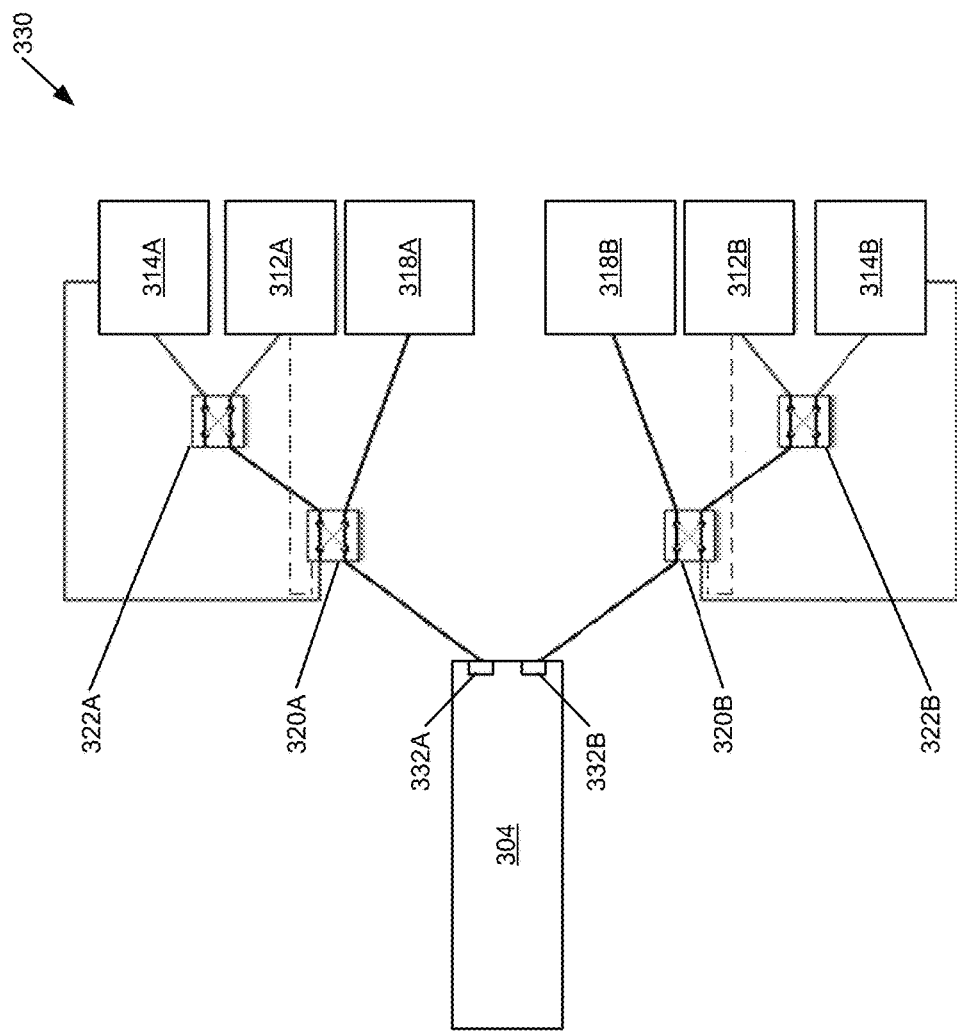
Figure 4A:
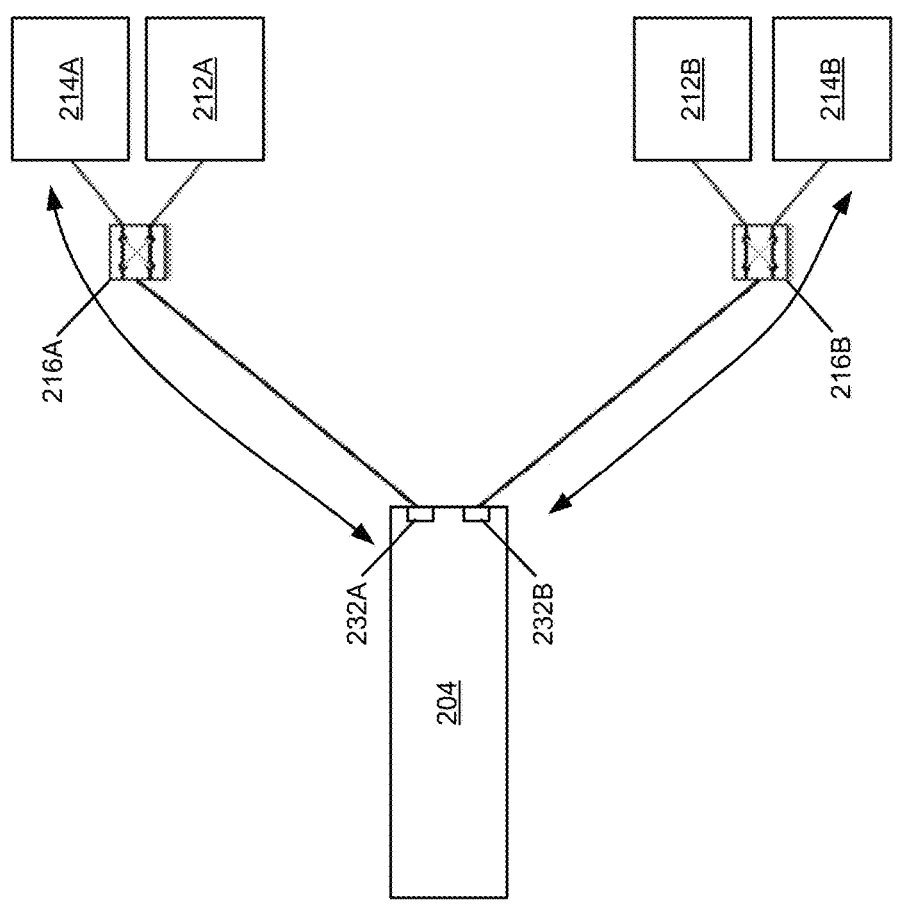
Figure 4B:
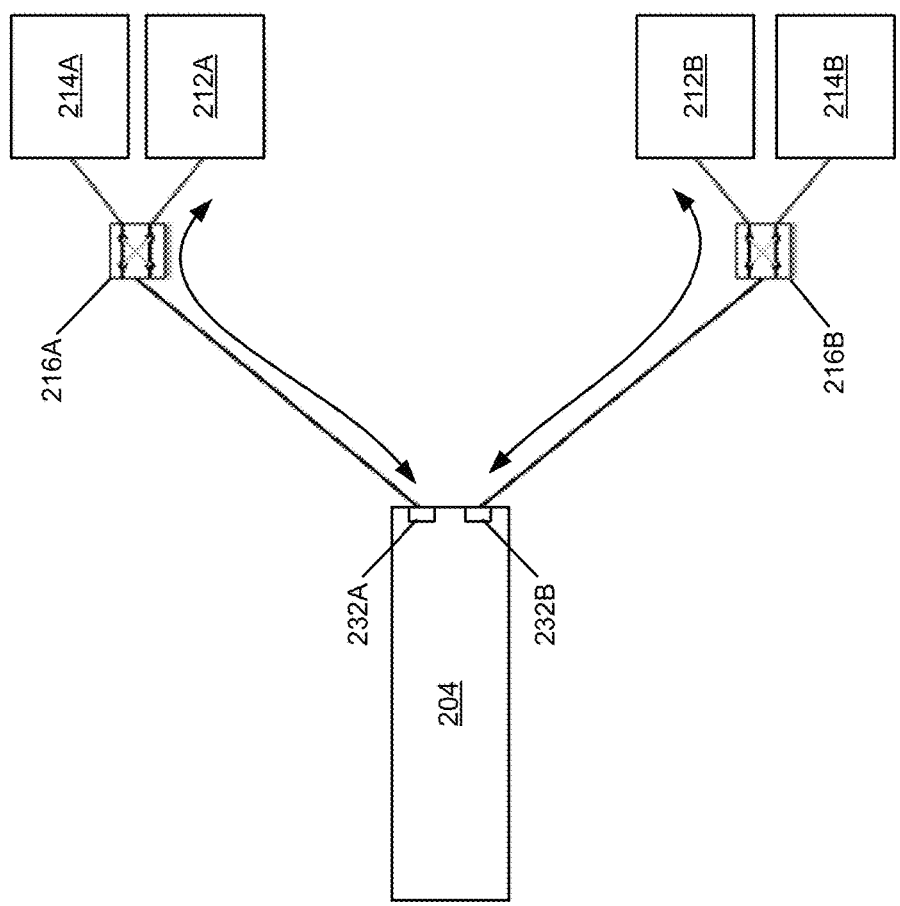
Figure 4C:
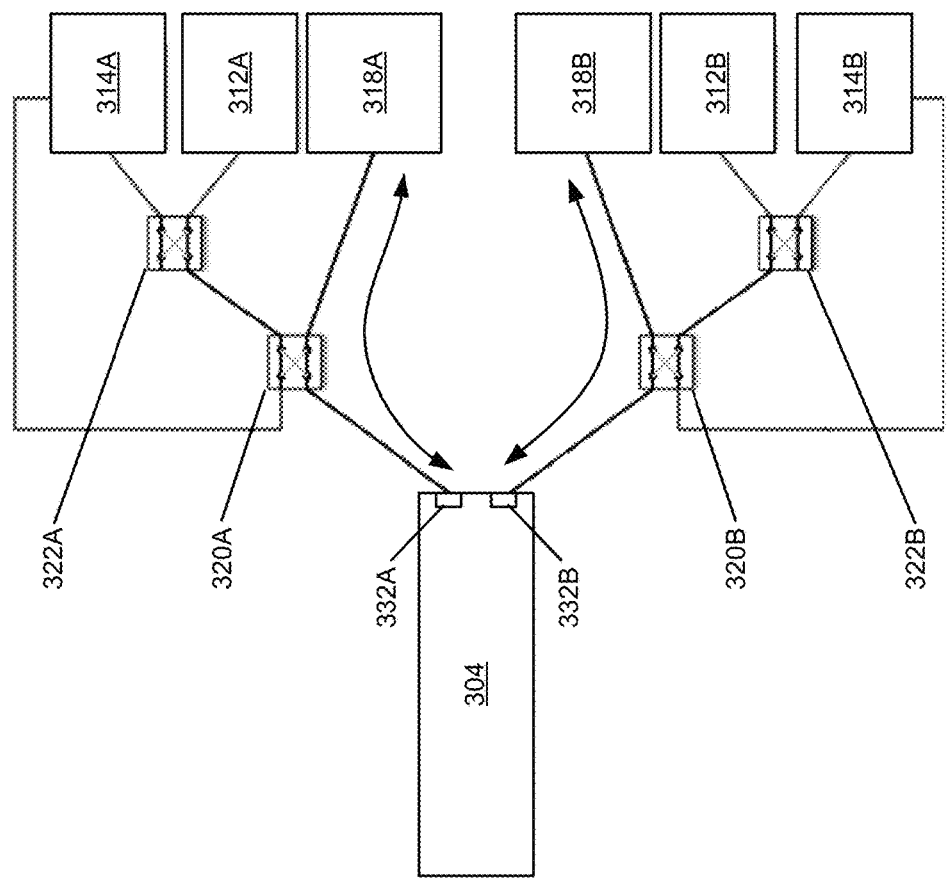
Figure 4D:
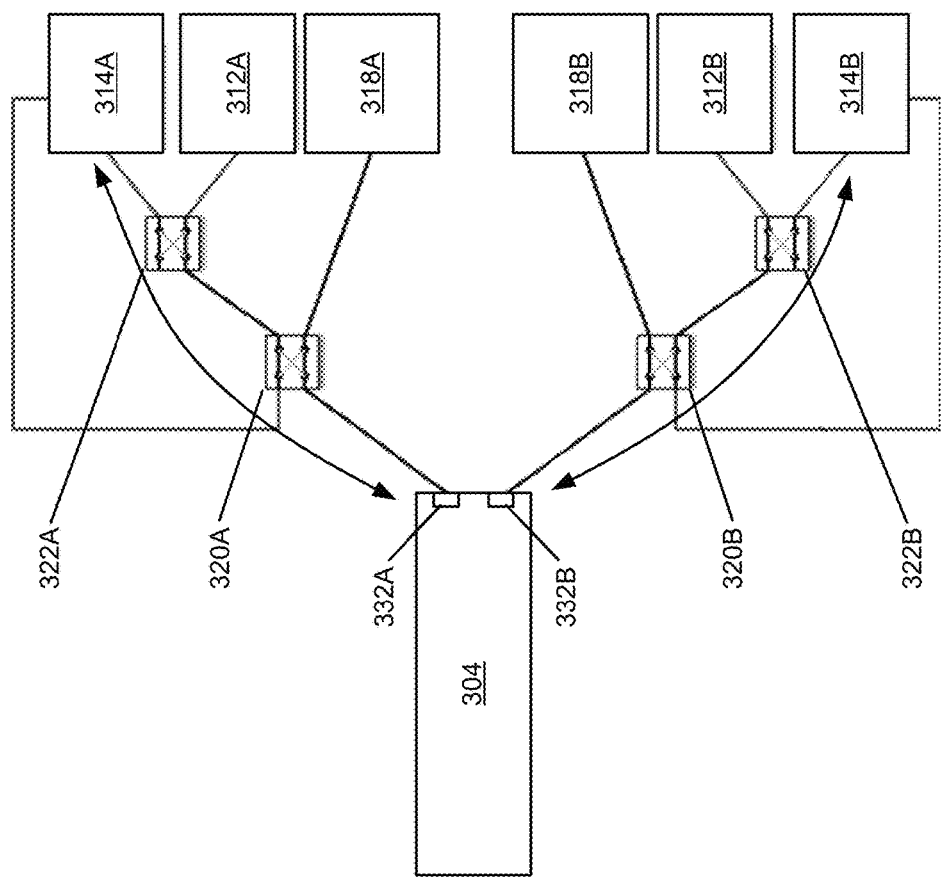
Figure 4E:
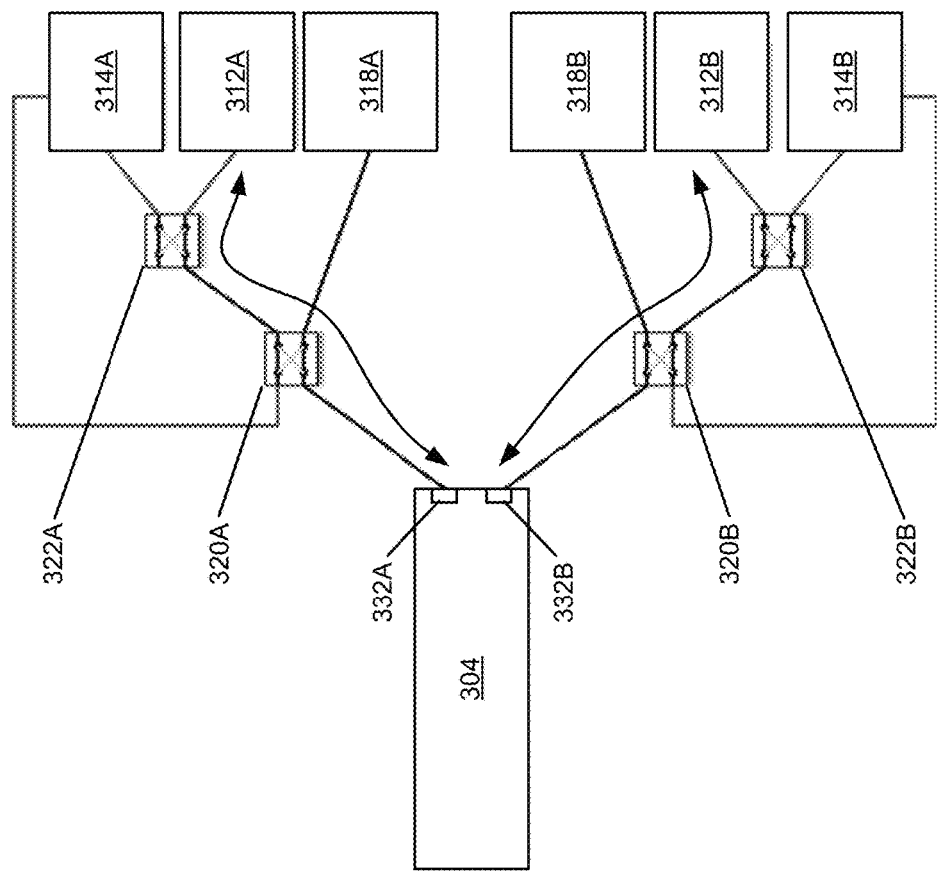

FIG. 3 shows a fabric of a storage assembly system, in accordance with one or more embodiments of the technology. In the exemplary storage assembly system (100), shown in FIGS. 1A-1C, all center storage modules use the fabric shown in FIG. 3. The fabric (330) interfaces with a set of solid state storage modules (304), and includes Peripheral Component Interconnect Express (PCIe) switches (312A, 312B), Gigabit Ethernet (GbE) Switches (314A, 314B), a set of dual-mode cross connects (320A, 320B), and a set of 2:1 multiplexers (322A, 322B). In the exemplary storage assembly system (100), shown in FIGS. 1A-1C, the GbE switches and the PCIe switches may interface with all solid state storage modules, regardless of whether the solid state storage modules are installed in a top, bottom or center location. Accordingly, the switches (312A, 312B, 314A, 314B) in FIG. 3 may be the same switches as the switches (212A, 212B, 214A, 214B), respectively, in FIG. 2. A storage assembly system such as the one shown in FIGS. 1A-1C may accommodate up to 24 solid state storage modules. However, for the sake of simplicity, only a single solid state storage module is shown in FIG. 3. Each of the solid state storage modules (304) in a storage assembly system may interface with the PCIe switches (312A, 312B) and/or the GbE switches (314A, 314B) via its own dual-mode cross connects (320A, 320B) and its own 2:1 multiplexers (322A, 322B), i.e., there may be separate, dedicated dual-mode cross connects and 2:1 multiplexers that each interface a particular solid state storage module (304) of the storage assembly system to the PCIe switches (312A, 312B) and to the GbE switches (314A, 314B).

Analogous to the 2:1 multiplexers (216A, 216B) of FIG. 2, the dual-mode cross connects (320A, 320B), in accordance with an embodiment of the technology, recondition the signals to and from a solid state storage module, for example, to extend the maximum possible cable or trace lengths. The dual-mode cross connects may be protocol-agnostic or they may be protocol-aware and may re-clock/re-time the data signals.

Unlike the 2:1 multiplexers (216A, 216B) of FIG. 2, the dual-mode cross connects (320A, 320B), in accordance with one or more embodiments of the technology, may also route data communications differently, depending on whether the dual-mode cross connects (320A, 320B) are operated in a first or in a second operating mode.

In the first operating mode (indicated by horizontal non-crossing black lines traversing the rectangles that represent the dual-mode cross connects (320A, 320B) in FIG. 3), the solid state storage module (304), interfacing with the dual-mode cross connects (320A, 320B) via the solid state storage module data connectors (332A, 332B), is connected to the chassis data connectors (118A, 118B). Thus, if a dual-mode cross connect (320A, 320B) performs in the first operating mode, the solid state storage module (304) connected to the dual-mode cross connect may directly communicate with equipment outside the storage assembly system. Because the solid state storage module, in this configuration, does not communicate with any of the switches (312A, 312B, 314A, 314B), the solid state storage module may use a protocol not supported by any of the switches. For, example, in the embodiment shown in FIG. 3, the solid state storage module may use the Fibre Channel protocol when the dual-mode cross connect is set to perform in the first operating mode.

In the second operating mode (indicated by diagonally crossing gray lines traversing the rectangles that represent the dual-mode cross connects (320A, 320B) in FIG. 3), the solid state storage module (304), interfacing with the dual mode cross connects (320A, 320B) via the solid state storage module data connectors (332A, 332B), is connected to either the GbE or to the PCIe switches (312A, 312B, 314A, 314B), via the 2:1 multiplexers (322A, 322B). Thus, if a dual-mode cross connect performs in the second operating mode, the solid state storage module may be connected to either GbE or the PCIe switches (312A, 312B, 314A, 314B). Further, in the second operating mode, the dual-mode cross connects (320A, 320B) may also connect the GbE switches (314A, 314B) to the chassis data connectors (318A, 318B). Additionally or alternatively, the dual-mode cross connects (320A, 320B) may connect the PCIe switches (312A, 312B) to the chassis data connectors (318A, 318B). Accordingly, the GbE switches (314A, 314B) and/or the PCIe switches (312A, 312B) may communicate with equipment outside the storage assembly system, if the dual-mode cross connects (320A, 320B) are in the second operating mode. A solid state storage module (304) may thus also be able to communicate with equipment outside the storage assembly system, via the GbE switches (314A, 314B), as further illustrated in the use cases described below.

Whether a dual-mode cross connect (320A, 320B) is performing in the first or in the second operating mode may thus be determined based on the protocol being used and/or based on whether a component that the solid state storage module (304) communicates with is located within the storage assembly system or outside the storage assembly system. The operation of the fabric (330) when the dual-mode cross connects (320A, 320B) are in the first and the second operating mode, respectively, are further described below, with reference to the use cases illustrated in FIGS. 4C-4F.

The 2:1 multiplexers (322A, 322B), analogous to the 2:1 multiplexers (216A, 216B) of FIG. 2 are configured to interface the solid state storage module (304), via the dual-mode cross connects (320A, 320B), with either the PCIe switches (312A, 312B) or the GbE switches (314A, 314B).

Each solid state storage module (304), as previously described, may be equipped with two solid state storage module data connectors (332A, 332B) that may redundantly interface with separate fabric segments, as shown in FIG. 3, thus enabling simultaneous data communications for increased data throughput and/or redundancy.

As previously noted, the chassis (102) of the storage assembly system (100), introduced in FIGS. 1A-1C may accommodate up to 24 solid state storage modules (104). While the upper and lower solid state storage modules may interface with a fabric as shown in FIG. 2, the center solid state storage modules may interface with a fabric as shown in FIG. 3. Also, as previously noted, each solid state storage module (104) is equipped with two solid state storage module data connectors. If a solid state storage module uses the PCIe protocol, each of the connectors may operate at PCIe ×4. Accordingly a total of 2×24×4=2×96 PCIe switch ports are required to accommodate all solid state storage modules. Accordingly, the two PCIe switches (212A, 212B, 312A, 312B) in FIGS. 2 and 3, respectively, may be 96 port PCIe switches. If the PCIe switches (312A, 312B) are, in addition, also interfacing with the dual-mode cross connects (320A, 320B) in order to reach the chassis data connectors (318A, 318B) (as indicated by the dashed lines in FIG. 3), the PCIe switches may have additional ports. In such a scenario, the PCIe switches (312A, 312B) may have, for example, 128 rather than 96 ports. The same number of ports may be used to provides GbE connectivity to solid state storage modules that use the GbE standard. As illustrated in FIG. 3, the GbE switches also connect to the chassis data connectors (318A, 318B) via the dual-mode cross connects (320A, 320B). Accordingly, each of the GbE switches may have a total of 96+32=128 ports, if 32 ports are dedicated to communications with equipment outside of the storage assembly.

One skilled in the art will recognize that the architecture of the storage assembly system and the fabrics implemented in the storage assembly system are not limited to the components shown in FIGS. 1A-3. For example, different and/or additional protocols may be supported. Further, in addition to or alternatively to solid state storage modules, other types of hardware modules, such as compute modules, may be inserted into the storage assembly system, without departing from the technology. One or more compute modules, in accordance with an embodiment of the technology may, for example, orchestrate the storage system by acting as, e.g., a storage server on a GbE network. A compute module may further act as a protocol translator, e.g., between the GbE and the PCIe protocols. In one embodiment of the technology, the storage assembly system is equipped with compute modules only and may thus not include solid state storage modules. Such as system may be a micro-server that would rely on persistent storage that is located outside the chassis. Compute modules, inserted into the chassis of the storage assembly system, may be equipped with CPUs, GPUs, FPGAs or other types of processors. A storage assembly system equipped with one or more such compute modules may be used, for example, as a data acquisition system, e.g. in real time data acquisition applications, where data from external sensors or other data sources may be obtained via the chassis data connectors. In this case, the chassis data connectors may relay raw sensor signals, or generally data signals of any type to the compute module. The compute module may store the acquired signals on the solid state storage modules either within the storage assembly system, or distributed over other storage systems.

The use case scenarios described below are intended to provide examples for data transmission by the solid state storage modules via the fabric, previously described with reference to FIGS. 2 and 3. The use case scenarios are for illustrative purposes only. The storage assembly device and the fabric of the storage assembly device described by FIGS. 1A-3 are not limited to the exemplary data transmissions illustrated in FIGS. 4A-4F.

EXAMPLE USE CASE 1

Consider a scenario in which a solid state storage module that is located in either an upper or a lower hardware module slot of the chassis is a solid state storage module that supports the GbE protocol. As illustrated by the curved arrows in FIG. 4A, the solid state storage module may communicate with other solid state storage modules, compute modules, and/or equipment outside the storage assembly system via the GbE switches, as described below in use case 6.

EXAMPLE USE CASE 2

Consider a scenario in which a solid state storage module that is located in either an upper or a lower hardware module slot of the chassis is a solid state storage module that supports the PCIe protocol. As illustrated by the curved arrows in FIG. 4B, the solid state storage module may communicate with other solid state storage modules and/or compute modules via the PCIe switches. The solid state storage module may further also communicate with equipment outside the storage assembly system, if the PCIe switches provide connectivity to the chassis data connectors, as described below in use case 6.

EXAMPLE USE CASE 3

Consider a scenario in which a solid state storage module that is located in a center hardware module slot of the chassis is a solid state storage module that supports a protocol different from PCIe and GbE. The protocol may be, for example, Fibre Channel or InfiniBand. As illustrated by the curved arrows in FIG. 4C, the dual-mode cross connects (320A, 320B) directly interface the solid state storage module with the chassis data connectors (318A, 318B) thereby enabling the solid state storage module to interface with equipment outside the storage assembly system, even though the switches of the storage assembly system may not provide support for Fibre Channel and/or Infiniband. The configuration of use case 3 may also be used for protocols that are supported by the switches, e.g., for PCIe and/or GbE.

EXAMPLE USE CASE 4

Consider a scenario in which a solid state storage module that is located in a center hardware module slot of the chassis is a solid state storage module that uses the GbE protocol. As illustrated by the curved arrows in FIG. 4D, the dual-mode cross connects (320A, 320B) interface the solid state storage module with the GbE switches (314A, 314B) via the 2:1 multiplexers (322A, 322B). The solid state storage module may thus communicate with other solid state storage modules and/or compute modules via the GbE switches. The solid state storage module may thus also communicate with other equipment outside the storage assembly system, as described in use case 6.

EXAMPLE USE CASE 5

Consider a scenario in which a solid state storage module that is located in a center hardware module slot of the chassis is a solid state storage module that uses the PCIe protocol. As illustrated by the curved arrows in FIG. 4E, the dual-mode cross connects (320A, 320B) interface the solid state storage module with the PCIe switches (312A, 312B) via the 2:1 multiplexers (322A, 322B). The solid state storage module may thus communicate with other solid state storage modules and/or compute modules via the PCIe switches. The solid state storage module may thus also communicate with other equipment outside the storage assembly system, as described in use case 6.

EXAMPLE USE CASE 6

Consider a scenario in which a solid state storage module that is located in a center hardware module slot of the chassis is a solid state storage module that uses either the GbE standard or the PCIe protocol. As illustrated by the curved arrows (solid line) in FIG. 4F, the dual-mode cross connects (320A, 320B) interface the GbE switches (314A, 314B) with the chassis data connectors (318A, 318B) A solid state storage module that uses the GbE protocol may thus interface with other equipment outside the storage assembly system via the chassis data connectors. Further, as illustrated by the curved arrows (dashed line) in FIG. 4F, the dual-mode cross connects (320A, 320B) optionally interface the PCIe switches (312A, 312B) with the chassis data connectors (318A, 318B) A solid state storage module that uses the PCIe protocol may thus also interface with other equipment outside the storage assembly system via the chassis data connectors.

Embodiments of the technology may enable a storage assembly system to accommodate multiple solid state storage modules and other types of hardware modules, regardless of the protocol that these modules support. The fabric of the storage assembly system may enable the solid state storage modules to communicate amongst each other, and with other equipment, located outside the storage assembly system. In one embodiment of the technology, the fabric uses switches in order to enable a maximum number of solid state storage modules to communicate with one another while simultaneously reducing the need for extensive connectivity between the solid state storage modules and between the solid state storage modules and equipment outside the storage assembly system. Further, in accordance with an embodiment of the technology, even solid state storage modules using protocols not supported by the switches of the storage assembly system may communicate with outside equipment, directly via chassis data connectors. In one embodiment of the technology, the computing power of the storage assembly system is customizable. The storage assembly system may, for example be equipped with solid state storage modules only, or it may accommodate a combination of solid state storage modules and compute modules.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A storage system comprising:
   a hardware module slot, configured to mechanically accommodate a first hardware module, comprising:
   a first hardware module data connector configured to electrically interface with the first hardware module when inserted into the hardware module slot;
   a fabric, comprising:
     a first switch, comprising:
       a first protocol interface to the first hardware module data connector,
       wherein the first switch is configured to enable first protocol communications between the first hardware module and a second hardware module; and
     a second switch, comprising:
       a second protocol interface to the first hardware module data connector,
       wherein the second switch is configured to enable second protocol communications between the first hardware module and the second hardware module;
   a chassis data connector configured to enable communications with the second hardware module, wherein the chassis data connector is protocol agnostic;
   a dual-mode cross connect, connected to the first hardware module data connector and the chassis data connector; and
   a multiplexer connected to the dual-mode cross connect, the first switch, and the second switch, and configured to interface the first hardware module with the first switch and the second switch,
   wherein the dual-mode cross connect is configured to support a first operating mode and a second operating mode,
   wherein the dual-mode cross connect, in the first operating mode:
     connects the first hardware module to the chassis data connector; and
     interfaces the first hardware module with the second hardware module, and
   wherein the dual-mode cross connect, in the second operating mode:
     connects the first hardware module to the multiplexer;
     interfaces the first hardware module with one selected from the group consisting of the first switch and the second switch;
     connects the second hardware module to the multiplexer; and
     interfaces the second hardware module with one selected from the group consisting of the first switch and the second switch.

2. The storage system of claim 1, wherein the hardware module slot is a top hardware module slot of the storage system.

3. The storage system of claim 1, wherein the hardware module slot is a bottom hardware module slot of the storage system.

4. The storage system of claim 1, wherein the multiplexer is protocol agnostic.

5. The storage system of claim 1, wherein the hardware module slot is a center hardware module slot of the storage system.

6. The storage system of claim 1, wherein the chassis data connector is configured to support communications using at least one protocol selected from the group consisting of a GbE protocol, a PCIe protocol, and a Fiber Channel protocol.

7. The storage system of claim 1,
   wherein the hardware module slot further comprises a second hardware module data connector configured to electrically interface with the first hardware module inserted into the hardware module slot; and wherein the fabric further comprises:
- a third switch, comprising:
  - a third protocol interface to the second hardware module data connector of the hardware module slot; and
- a fourth switch, comprising:
  - a fourth protocol interface to the second hardware module data connector of the hardware module slot.

8. The storage system of claim 7,
wherein the first switch and the third switch are functionally redundant, and
wherein the second switch and the fourth switch are functionally redundant.

9. The storage system of claim 1, wherein the first hardware module is a solid state storage module.

10. The storage system of claim 9, wherein the solid state storage module is a flash memory module.

11. The storage system of claim 1, wherein the first hardware module is a compute module.

12. The storage system of claim 1,
wherein the first switch is a Peripheral Component Interconnect Express (PCIe) switch; and
wherein the first protocol is a PCIe protocol.

13. The storage system of claim 1,
wherein the second switch is a Gigabit Ethernet (GbE) switch; and
wherein the second protocol is a GbE protocol.

14. The storage system of claim 1 further comprising a main printed circuit board, wherein the first and the second switch are located on the main printed circuit board.

15. The storage system of claim 1 further comprising a power supply.

* * * * *